US012558706B2

(12) United States Patent
La Croce et al.

(10) Patent No.: US 12,558,706 B2
(45) Date of Patent: Feb. 24, 2026

(54) PIEZOELECTRIC USER INTERFACE ARRANGEMENT, AND METHOD FOR DRIVING PIEZOELECTRIC ELEMENTS IN A USER INTERFACE ARRANGEMENT

(71) Applicant: AITO BV, Amsterdam (NL)

(72) Inventors: Davide La Croce, Vantaa (FI); Turo Hermanni Keski-Jaskari, Tuusula (FI)

(73) Assignee: Aito BV, Amsterdam (NL)

( * ) Notice: Subject to any disclaimer, the term of this patent is extended or adjusted under 35 U.S.C. 154(b) by 1145 days.

(21) Appl. No.: 17/593,972

(22) PCT Filed: Mar. 31, 2020

(86) PCT No.: PCT/EP2020/059089
§ 371 (c)(1),
(2) Date: Sep. 29, 2021

(87) PCT Pub. No.: WO2020/201266
PCT Pub. Date: Oct. 8, 2020

(65) Prior Publication Data
US 2022/0184659 A1 Jun. 16, 2022

(30) Foreign Application Priority Data
Apr. 2, 2019 (FI) ..................................... 20195265

(51) Int. Cl.
*B06B 1/02* (2006.01)
*G06F 3/01* (2006.01)
(52) U.S. Cl.
CPC ............ *B06B 1/0215* (2013.01); *G06F 3/016* (2013.01)

(58) Field of Classification Search
CPC ....... B06B 1/0215; H02N 2/0075; H02N 2/06
(Continued)

(56) References Cited

U.S. PATENT DOCUMENTS 7,119,475 B2 * 10/2006 Matsuzaki ............. H02N 2/142
310/316.02
2006/0082253 A1 * 4/2006 Hara ...................... H02N 2/062
310/317
(Continued)

FOREIGN PATENT DOCUMENTS

CN 102609078 A 7/2012
CN 102739193 A 10/2012
(Continued)

OTHER PUBLICATIONS

Chinese Patent Application No. 202080026201.2, Office Action mailed Jun. 9, 2023 (10 pages).
(Continued)

*Primary Examiner* — Derek J Rosenau
(74) *Attorney, Agent, or Firm* — Leydig, Voit & Mayer, Ltd.

(57) ABSTRACT

Piezoelectric user interface arrangement comprises a voltage converter for controllably generating voltage waveforms driving one or more piezoelectric elements. The voltage converter has a control input. A controller is coupled to said control input to control an output voltage of said voltage converter. The controller has one or more scaling inputs. The controller forms said control signals to make said output voltage follow a target waveform as a function of time. The controller is configured to scale said target waveform on the basis of scaling information received through said one or more scaling inputs.

10 Claims, 4 Drawing Sheets

(58) Field of Classification Search
USPC ............................................ 310/316.01, 317
See application file for complete search history.

(56) References Cited

U.S. PATENT DOCUMENTS

| | | | |
|---|---|---|---|
| 2012/0313682 A1 | 12/2012 | Sprentall et al. | |
| 2014/0292691 A1 | 10/2014 | Sugiyama | |
| 2016/0048260 A1 | 2/2016 | Ivanov et al. | |
| 2016/0259480 A1 | 9/2016 | Augenbergs et al. | |

FOREIGN PATENT DOCUMENTS

| | | | |
|---|---|---|---|
| CN | 108966680 A | 12/2018 | |
| JP | 2017073932 A | 4/2017 | |

OTHER PUBLICATIONS

International Search Report for PCT/EP2020/059089 (ISA/EP) mailed Jun. 24, 2020 (2 pages).
Written Opinion for International Application No. PCT/EP2020/059089 (ISA/EP) mailed Jun. 24, 2020 (6 pages).
International Preliminary Report on Patentability for PCT/EP2020/059089 (IPEA/EP) mailed Jun. 21, 2021 (23 pages).
Search Report for Finnish Application No. 20195265 dated Aug. 2, 2019 (2 pages).

* cited by examiner

PIEZOELECTRIC USER INTERFACE ARRANGEMENT, AND METHOD FOR DRIVING PIEZOELECTRIC ELEMENTS IN A USER INTERFACE ARRANGEMENT

CROSS-REFERENCE TO RELATED APPLICATIONS

The present application is a national phase entry of International Application No. PCT/EP2020/059089, filed Mar. 31, 2020, which claims priority to Finnish Application No. 20195265, filed Apr. 2, 2019, which are incorporated herein by reference in their entirety.

FIELD OF THE INVENTION

The invention concerns the technology of generating haptic effects in electromechanical user interface devices. In particular the invention concerns the task of ensuring satisfactory and consistent user experience irrespective of the number of piezoelectric elements to be driven, and irrespective of other factors such as manufacturing tolerances of piezo elements, changing environmental conditions like temperature, and others.

BACKGROUND OF THE INVENTION

Piezoelectric elements are commonly used to generate haptic effects, i.e. recreation of the sense of touch by applying forces, vibrations, or motions to the user, in input devices such as touchkeys, touchscreens, and the like. A piezoelectric element can be used both to sense a pressing force applied by the user and to generate the haptic feedback. The first-mentioned involves sensing a voltage that the piezoelectric element generates in response to mechanical deformation, and the latter involves applying a voltage waveform to the piezoelectric element that temporarily deforms it mechanically, causing a corresponding elastic movement in the surrounding structures.

For the task of applying the voltage waveform to the piezoelectric element a driver circuit is used. FIG. 1 illustrates schematically the combination of a piezoelectric element 101 with a driving circuit. A voltage source 102 provides an input voltage to a voltage converter 103, the task of which is to generate the voltage waveform. An output filter 104 is shown here separately, although it could be considered a part of the voltage converter 103. A control circuit 105 controls the operation of the other blocks; it may receive feedback measurements from and give control commands to them.

The amplitude of a voltage waveform needed to drive a piezoelectric element 101 may be relatively high, in the order of some hundreds of volts, while the voltage provided by the voltage source 102 is typically much lower, for example in the order of only a few volts, or in the order of ten or twelve volts. Therefore the voltage converter 103 must include voltage boosting capability, to controllably take the output voltage to the full amplitude of the voltage waveform and back. The time duration of the voltage waveform is typically measured in some milliseconds, or some tens of milliseconds. The waveform may be a voltage pulse of single polarity, or it may involve one or more negative-polarity half-waves and one or more positive-polarity half-waves, so the amplitude meant here is the absolute value of amplitude. Suitable control signals from the control circuit 105 can be used to make the voltage converter 103 produce the voltage waveform exactly at desired amplitude and form.

It has been found that the form of the voltage pulse has a significant effect on the user experience, involving not only the sense of touch but also the sense of hearing of the user. In particular, the first- and higher-order time derivatives of the voltage, i.e. the rate at which voltage changes at each part of the voltage waveform, are important. As a basic rule, keeping the first-order time derivative of the voltage small enough enables suppressing audible artefacts that in many application cases are undesirable. In other cases a certain audible sound may be aimed at, meaning that the voltage waveform is deliberately designed to involve fast enough changes.

Problems may arise, however, if the same driver circuit should be used to drive several piezoelectric elements simultaneously, and/or if changes in temperature or other environmental conditions change the mechanical response of the structures affected by the piezoelectric element. As an example, the manufacturer of piezoelectric input devices may deliver to a car manufacturer, who would like to use these in various parts of the car dashboard. In some part of the dashboard a driver circuit has only one piezoelectric element to drive, while in some other part there are four or more piezoelectric elements to be driven simultaneously by a single driver circuit. The larger load presented by the plurality of piezoelectric elements may exceed the output capability of the driver circuit. As a result, the voltage waveform may distort, with the disadvantageous consequence that the user experience is not what it should.

A brute-force solution to the problem would be to always equip each piezoelectric element with a driver circuit of its own, but this is a costly solution both in terms of component cost and required installation space. Another brute-force solution would be to design the driver circuit so that it has sufficient power to drive even the largest number of piezoelectric elements that will be encountered. That too would be costly, because the driver circuit would be overdimensioned for a majority of cases. Yet another solution would be to provide a suite of differently dimensioned driver circuits, but that would involve obvious problems in logistics and management of product portfolio.

SUMMARY

It is an objective of the present invention to provide a piezoelectric user interface arrangement that is flexibly applicable to drive piezoelectric elements under various conditions, without having to overdimension its components.

This and other advantageous objectives are achieved by using a controller that can scale a target waveform on the basis of scaling information that may be obtained in advance and/or dynamically during the generation of a voltage waveform.

According to a first aspect there is provided a piezoelectric user interface arrangement. It comprises a voltage converter configured to controllably generate voltage waveforms for driving one or more piezoelectric elements. The voltage converter has a control input. The piezoelectric user interface arrangement comprises a controller coupled to said control input and configured to control an output voltage of the voltage converter by applying control signals to the control input. The controller has one or more scaling inputs, and is configured to form said control signals to make said output voltage follow a target waveform as a function of time. The controller is configured to scale said target waveform on the basis of scaling information received through its one or more scaling inputs.

According to an embodiment the controller is configured to scale an amplitude of said target waveform on the basis of the scaling information. This involves the advantage that the generation of the voltage waveform may succeed better in general if one does not attempt to generate such high voltages that under certain circumstances prove to be difficult or impossible.

According to an embodiment the controller is configured to scale a length in time of said target waveform on the basis of said scaling information. This involves the advantage that the time derivative characteristics of the voltage waveform can be controlled more accurately.

According to an embodiment the scaling input comprises a configuring input for receiving at least a part of said scaling information in advance as configuration information. This involves the advantage that the operation of the piezoelectric user interface arrangement can be proactively adapted to different conditions.

According to an embodiment the scaling input comprises a feedback input for receiving at least a part of said scaling information dynamically as feedback information during the generation of a voltage waveform. This involves the advantage that the operation of the piezoelectric user interface arrangement can be flexibly adapted even to conditions that cannot be taken into account in advance.

According to an embodiment the feedback input comprises a voltage feedback input for receiving feedback of said output voltage. This involves the advantage that accurate and reliable feedback can be obtained with a relatively simple circuit.

According to an embodiment the feedback input comprises a current feedback input for receiving feedback of an output current of said voltage converter. This involves the advantage that feedback may be made indicative of actual output power.

According to an embodiment the scaling input comprises an internal input for using a quantity internal to the controller as said scaling information. This involves the advantage that the scaling can be performed completely within the controller circuit, preferably with programmable means.

According to an embodiment the voltage converter comprises a boost converter that comprises a power switch for closing and opening a current path through a boost inductor; said control signals are switching pulses to said power switch; and said controller is configured to change at least one of the duty cycle and the switching frequency of said switching pulses for controlling said output voltage. This involves the advantage that even relatively high output voltages can be generated and controlled in a well-known and stable manner.

According to a second aspect there is provided a method for driving piezoelectric elements in a user interface arrangement. The method comprises controllably generating a voltage waveform for driving one or more piezoelectric elements, controlling the generation of said voltage waveform to make the generated voltage waveform follow a target waveform as a function of time, and scaling said target waveform on the basis of received scaling information.

According to an embodiment said scaling of said target waveform comprises scaling at least one of an amplitude and a length in time of said target waveform. This involves the advantages that the generation of the voltage waveform may succeed better in general if one does not attempt to generate such high voltages that under certain circumstances prove to be difficult or impossible, and that the time derivative characteristics of the voltage waveform can be controlled more accurately.

According to an embodiment at least a part of said scaling information is received in advance as configuration information. This involves the advantage that the operation of the piezoelectric user interface arrangement can be proactively adapted to different conditions.

According to an embodiment the method comprises receiving at least a part of said scaling information dynamically as feedback information during the generation of said voltage waveform. This involves the advantage that the operation of the piezoelectric user interface arrangement can be flexibly adapted even to conditions that cannot be taken into account in advance.

According to an embodiment said feedback information comprises voltage feedback from the generation of the voltage waveform. This involves the advantage that accurate and reliable feedback can be obtained with a relatively simple circuit.

According to an embodiment said feedback information comprises current feedback of an output current used to deliver the voltage waveform. This involves the advantage that feedback may be made indicative of actual output power.

According to an embodiment a voltage converter is used to generate said voltage waveform, control signals are given as switching pulses to a power switch in said voltage converter, and the method comprises changing at least one of a duty cycle and a switching frequency of said switching pulses to make said output voltage of said voltage converter follow said target waveform as a function of time. This involves the advantage that even relatively high output voltages can be generated and controlled in a well-known and stable manner.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
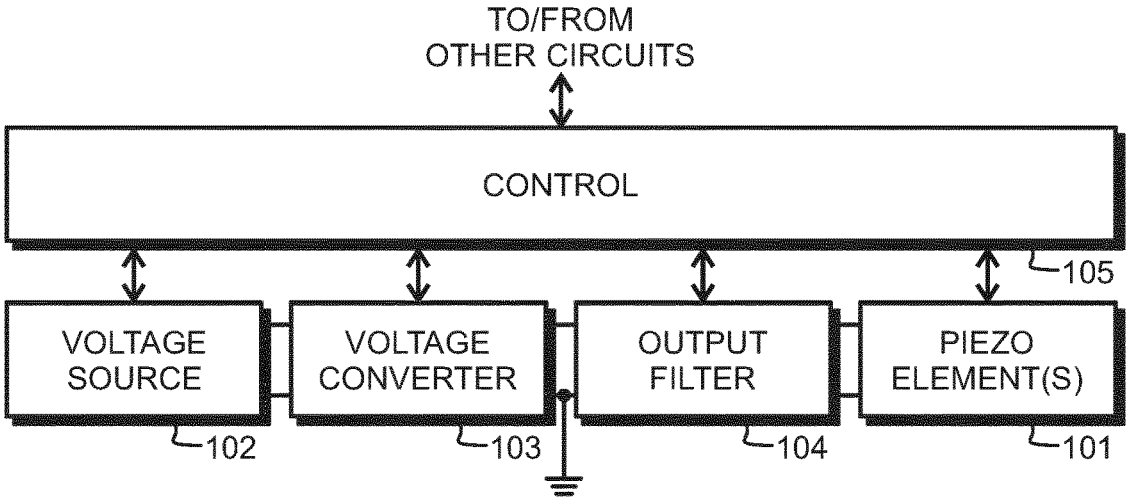
FIG. 1 illustrates a piezoelectric user interface arrangement.
Figure 2:
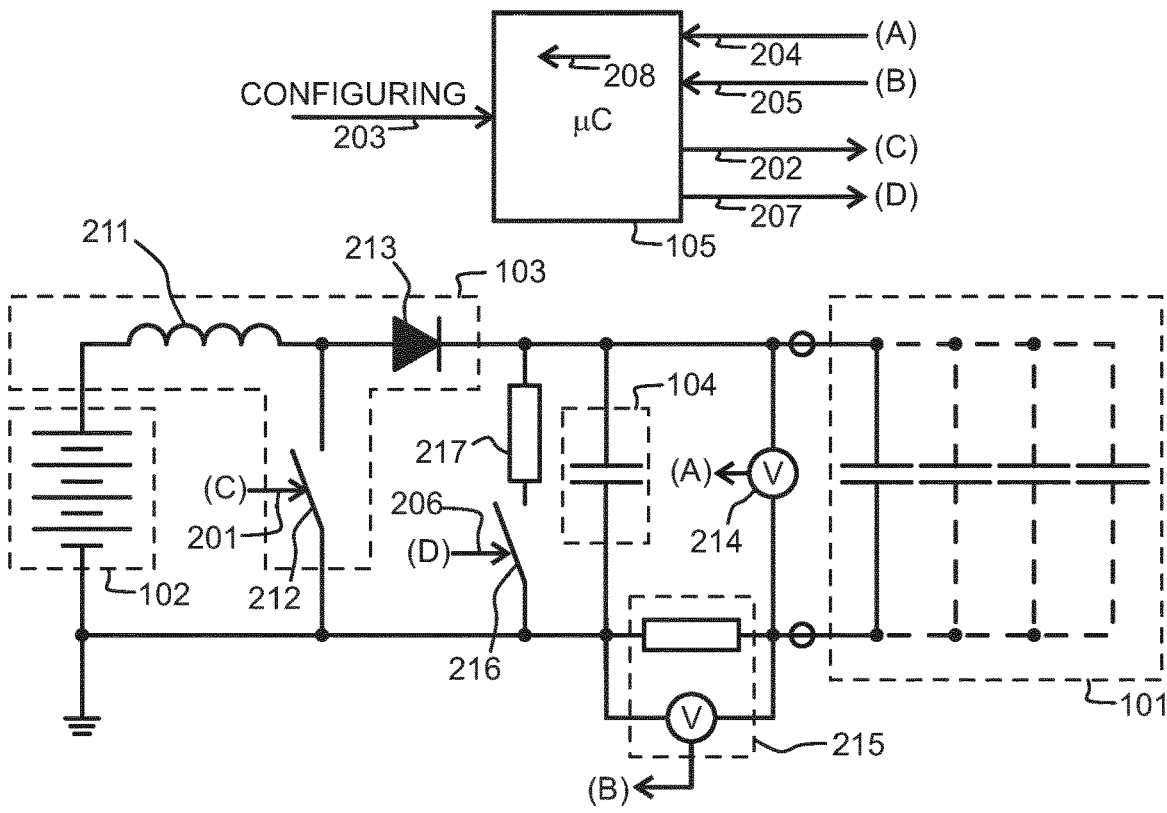
FIG. 2 illustrates an exemplary implementation of a piezoelectric user interface arrangement.

FIGS. 1 and 2 are comparable to each other in that FIG. 2 illustrates one example of how the principle of FIG. 1 can be realized in practice. As always with electronic circuitry it should be noted that the example of FIG. 2 illustrates just one of a number of possible implementations. A variety of other possible implementations exist, as is clear to the person skilled in the art in the light of the following description of how the various parts of the apparatus are expected to operate and interact with each other.

A piezoelectric user interface arrangement like that shown in FIGS. 1 and 2 comprises a voltage converter 103 that is configured to controllably generate voltage waveforms for driving one or more piezoelectric elements 101. The voltage converter 103 has a control input 201. In the example of FIG. 2 the voltage converter 103 has the topology of an inductive boost converter, in which a current loop can be formed from the positive node of a voltage source 102 through a boost inductor 211 to the negative node of the voltage source 102 by closing a power switch 212. A diode 213 is forward-coupled from the point between the boost inductor 211 and the power switch 212 to one output node of the voltage converter 103, and a coupling to the negative node of the voltage source 102 constitutes the other output node.

The control input 201 controls the state of conduction of the power switch 212. Repeated switching pulses to the control input 201 make the power switch 212 alternate between conductive and non-conductive states, which causes an output voltage to appear at the output of the voltage converter 103. A capacitor is used as the output filter 104 to smooth the output voltage. The boost topology means that the output voltage may be higher than voltage available at the voltage source 102. Varying the frequency and/or pulse width of the switching pulses makes the output voltage vary. A real-life voltage converter with boost topology is likely to comprise numerous other components, and this simplified example is used here only for graphical clarity and ease of understanding.

Using switching pulses to the power switch 212 as the control signal, and using a switch-controlling line like that in FIG. 2 as the control input 201 are also just examples. The known technology of controlling the output voltage of voltage converters offers numerous alternatives, such as using a dedicated switch driver circuit as a part of the voltage converter and giving the control signal(s) to said switch driver circuit in the form of voltage level(s) or the like. For the purposes of this description it is sufficient to assume that there is an unambiguous relation between the control signals and the output voltage of the voltage converter 103, and this relation can be used to drive the output voltage high enough, and change the output voltage in a fast and controlled enough manner, to be useful in driving the one or more piezoelectric elements 101.

The boost topology is an advantageous choice for the voltage converter 103 in the sense that it can produce an output voltage that is significantly higher than the input voltage, its operating characteristics are well known, and its operating stability is good. Other converter topologies can be used, such as the known SEPIC, buck-boost, flyback, half-bridge, full-bridge, forward, or split-pi topologies, or a capacitive charge pump, for example. If a high enough input voltage is available, the voltage converter may have a topology that does not produce an output voltage higher than the input voltage, such as the buck topology. A basic converter topology can be augmented with additional circuits at its output such as a voltage doubler for example to make the largest obtainable output voltage reach a desired level.

The piezoelectric user interface arrangement like that shown in FIGS. 1 and 2 comprises a controller 105 that is coupled to the control input 201 of the voltage converter 103. FIG. 2 shows said coupling so that there is a control signal output 202 in the controller 105, and a coupling (C-C) exists between the control signal output 202 and the control input 201. The controller 105 is configured to control the output voltage of the voltage converter 103 by applying control signals to the control input 201. Above some examples of control signals were discussed already; in the simplified example of FIG. 2 the controller 202 would produce the switching pulses that would be conducted to the control input 201 to control the state of conduction of the power switch 212. In such a case the controller 105 is configured to change the duty cycle and/or the switching frequency of the switching pulses for controlling the output voltage of the voltage converter 103. The controller 105 comprises also one or more so-called scaling inputs 203, 204, and 205, the significance and use of which are described in more detail later in this text.

Another part that is schematically shown in FIG. 2 is the controllable discharge connection that comprises a discharge switch 216 and a discharge resistor 217 coupled in series across the output of the voltage converter 103. The controller 105 has an additional control signal output 207 for controllably making the discharge switch 216 conductive or non-conductive. The controller 105 can use the controllable discharge connection to discharge electric energy from the output of the voltage converter 103, which may help to shape the output voltage waveform of the voltage converter 103 in particular on its falling parts. A more versatile form of a controllable discharge connection can be provided, for example by using a semiconductor switch that can be driven in its linear region, and/or by using a number of different, separately controllable current paths.

The controller 105 may be or comprise a microprocessor, a microcontroller, a control computer, or other kind of a programmable device that can be made to operate in a desired manner by programming, i.e. making it execute one or more sets of one or more machine-readable instructions stored on a machine-readable medium. The controller 105 may comprise an internal program memory for storing such instructions, and/or it may read such instructions from one or more external memory means. Yet another possibility is to use a fixed-function state machine, which strictly speaking is not programmable. The controller 105 may be a dedicated controller of the piezoelectric user interface arrangement, or it may be a controller of a larger entity so that only one part of its tasks concern the piezoelectric user interface arrangement. The controller 105 may comprise and implement functionalities that are at least partly distributed between several physical entities, like a higher-level control computer responsible for the operation of a larger entity and a lower-level control circuit that only interacts with the other parts of the piezoelectric user interface arrangement, under the control and supervision of said higher-level control computer.

The controller 105 is configured to form the control signals in such a way that they make the output voltage of the voltage converter 103 follow a target waveform as a function of time. This is possible when the operating characteristics of the voltage converter 103 are known well enough. For example for an ideal voltage converter that has a boost topology, the output voltage can be calculated from the input voltage and the duty cycle of the switching pulses in a known way. Assuming that the input voltage remains constant, the controller 105 can make the output voltage follow a target waveform by applying to the control input 201 switching pulses with a correspondingly varying duty cycle D. Known deviations from ideal operations can be accounted for by making compensating changes to the way in which the switching pulses are generated.

The target waveform can be thought of as a voltage-per-time graph that has been stored in a memory that is available to the controller 105 and that the output voltage of the voltage converter 103 is expected to follow. When there comes a triggering input, for example a processor interrupt that calls for giving a piece of haptic feedback to user with the piezoelectric element(s), the controller 105 reacts by outputting the corresponding control signals during a time interval that corresponds to the length in time during which the piece of haptic feedback is to be given. The present invention extends the concept of target waveforms to ones that are computed on the fly, during the generation of a voltage waveform, as will be explained in more detail later in this text.

As was pointed out earlier in this text, in some cases it may happen that if the controller 105 just follows the previously stored target waveform in giving the control signals, the eventual output voltage will not actually behave according to the target waveform. The reason for that may be for example that so many piezoelectric elements 101 have been coupled in parallel that the load capacitance that they represent together becomes too large for the voltage converter 103 to handle properly. Another possible reason is that the temperature of the piezoelectric element(s) differs so much from a default temperature that the mechanical properties of the piezoelectric element(s) are far from what they were supposed to be. An output voltage waveform that deviates from the target waveform may cause undesired effects, like unwanted noise and/or erratic kind of elastic deformation in the piezoelectric element(s) 101.

Voltage feedback from the output of the voltage converter 103 to an input of the controller 105 can be used to some extent to counteract a tendency of the output voltage deviating from the target waveform. However, voltage feedback only works as long as there is sufficient reserve capacity available in the voltage converter 103, which is not always the case.

In order to provide better adaptability in case the original target waveform cannot be followed the controller 105 is configured to scale the target waveform on the basis of scaling information received through the one or more scaling inputs 203, 204, or 205. Examples of what kind of scaling information could be received, where such scaling information could originate from, and how said scaling of the target waveform is actually implemented are described in the following.

Figure 3:
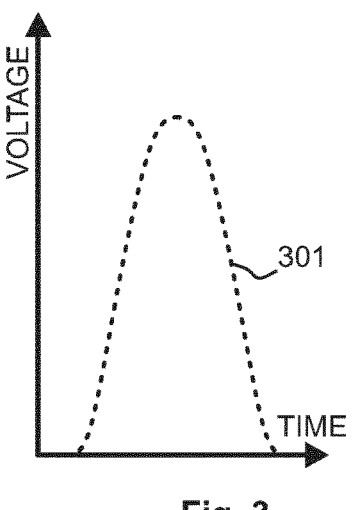
FIG. 3 illustrates an example of a target waveform.
Figure 4:
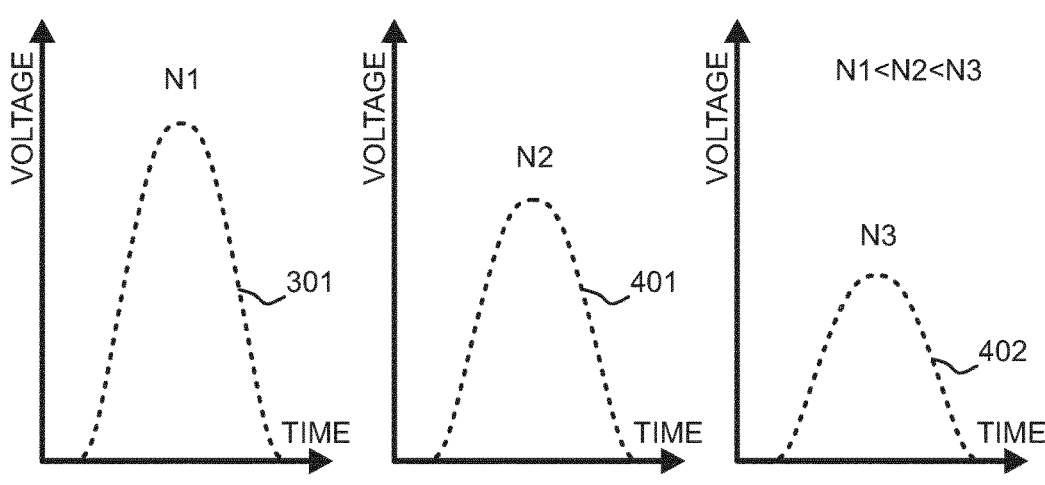
FIG. 4 illustrates an example of scaling a target waveform in advance on the basis of configuration information.
Figure 5:
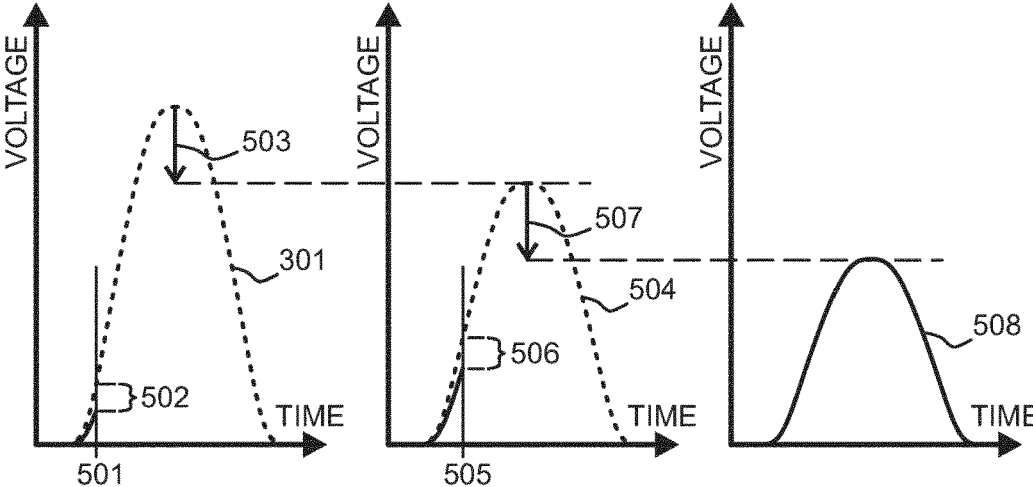
FIG. 5 illustrates an example of scaling a target waveform dynamically on the basis of feedback information.

FIGS. 3 to 5 concern examples in which the controller 105 is configured to scale an amplitude of the target waveform on the basis of the scaling information. An example of the original form of the target waveform is shown as the voltage-per-time graph 301 of FIG. 3. For graphical clarity and ease of understanding the target waveform is here shown to only comprise a single, positive half-wave. This should not be construed as a limitation: the same considerations apply regardless of the polarity and/or complexity of the target waveform.

One example of a scaling input to the controller 105 is a configuring input, through which the controller 105 may receive at least a part of the scaling information in advance as configuration information. In other words, from some external source the controller 105 may receive information about a non-default configuration of the piezoelectric user interface arrangement. A default configuration may be for example one where the piezoelectric user interface comprises N1 piezoelectric element(s), where N1 is a positive integer (N=1, 2, 3, . . . ). The leftmost target waveform in FIG. 4 shows how the original target waveform 301 will apply unchanged when the number of piezoelectric elements to be driven is N1. Configuration information that tells the number of piezoelectric elements to be N2 or N3, where N2 and N3 are positive integers and N1<N2<N3, makes the controller 105 scale the target waveform smaller in amplitude, as illustrated by the scaled target waveforms 401 and 402 in the middle and on the right in FIG. 4.

In addition to (or as an alternative to) the number of piezoelectric elements to be driven, the configuration information may relate to other factors. For example in the dashboard of a car or other installation that may be used under widely varying environmental conditions the configuration information may comprise an indicator of a temperature that affects the piezoelectric element(s). In general, configuration information comprises all information that can be provided to the controller 105 in advance, i.e. before the actual production of the output voltage according to the (scaled) target waveform takes place. It encompasses also information that the controller 105 and/or some closely associated circuit can autonomously generate in advance, like self-measured temperature and/or capacitance of the load, and/or accumulated information on how the load changes as a function of temperature.

In addition to (or as an alternative to) configuration information the scaling information may comprise feedback information that is obtained dynamically during the generation of a voltage waveform. The schematic illustration in FIG. 2 shows two examples of means that can be used dynamically to obtain feedback in real time: a voltage detection circuit 214 and a current detection circuit 215. In this kind of operation the feedback information is thus not used (only) to make the voltage converter 103 follow more closely a previously stored target waveform, but the target waveform itself is changed. Feedback information can be obtained also from other measured quantities, like the effort that appears to be needed to make the generated waveform follow the target waveform. An example is shown in FIG. 5.

The leftmost part of FIG. 5 shows how an original target waveform 301 is still the one to be aimed at when the piezoelectric user interface arrangement begins a particular instance of generating haptic feedback to a user. It is possible, though not mandatory, that voltage feedback is initially applied as an attempt to ensure that the actual output voltage of the voltage converter 103 follows the target waveform. However, at the moment of time shown as 501, quite early in relation to the overall length in time of the target waveform, feedback information indicates that there is a gap 502 between the currently valid target waveform 301 and the actual achieved output voltage (the development of which is shown with a solid line in FIG. 5). This feedback information makes the controller 105 scale the amplitude of the target waveform lower as shown with the arrow 503, so that the new target waveform is the scaled target waveform 504 in the middle part of FIG. 5.

One of the other examples mentioned above, i.e. obtaining feedback from the effort that appears to be needed, may work for example in the following way. The controller knows, what duty cycle should suffice to make the generated voltage waveform follow the target waveform at moment 501. However, voltage feedback has already caused a larger-than-expected duty cycle to be used. In other words, it may happen that there is no gap 502 at moment 501, but the fact that a higher-than-expected effort was needed indicates that there may develop a gap later, because there may come a moment at which the voltage feedback cannot increase the duty cycle any more even if the peak of the target waveform was not yet reached.

The controller may perform the examination of the actual duty cycle and its comparison to expected duty cycle internally. Therefore the concept of "scaling inputs" to the controller may be generalized to cover also internal inputs, for example one that feeds the actual duty cycle into evaluation and comparison to the expected duty cycle. An internal input may use a quantity internal to the controller as the scaling information. Such an internal input may be implemented by suitable programming in the instructions executed by the controller. An internal scaling input 208 is schematically shown in FIG. 2 for this purpose.

Irrespective of what actually triggered the scaling at moment 501 the current instance of generating the haptic feedback to the user continues. If voltage feedback control is in use, it may strive to ensure that the actual output voltage of the voltage converter 103 follows the new, scaled target waveform 504. In FIG. 5 it is assumed, however, that at a moment 505 that is still quite early in relation to the overall length in time of the target waveform the feedback information indicates that there is still a gap 506 between the currently valid target waveform 504 and the actual achieved output voltage. This feedback information makes the controller 105 scale the amplitude of the target waveform still lower as shown with the arrow 507, so that the new target waveform is the scaled target waveform 508 in the rightmost part of FIG. 5.

In FIG. 5 it is assumed that after the second scaling shown with the arrow 507 the continuously obtained voltage feedback information shows that the actual output voltage of the voltage converter 103 follows the newest, two times scaled target waveform at a predefined, sufficient accuracy. Thus there will be no more scaling of the target waveform this time, and the actual output voltage develops over time so that if drawn in the same coordinate system it overlaps with the target waveform 508.

It is advantageous to make the controller store the "lessons learned" in a situation like that of FIG. 5. Taken that the target waveform had to be scaled during the generation of the most recent voltage waveform for some reason, it is probable that the same reason persists also next time when a voltage waveform is to be generated. In order to lessen or avoid the need of repeated scaling of the same kind the controller may store the final, scaled target waveform 508 as the new default target waveform that is to be applied next time. As a more general definition, the controller may store in volatile or nonvolatile memory information indicative of effective measures for generating the voltage waveform found during one or more previous generating attempts. Reading such stored information for the purpose of generating a proper voltage waveform that follows a (scaled) target waveform is then considered as one form of receiving scaling information through an internal input 208.

In addition to or as an alternative to voltage feedback information, the controller 105 may receive feedback of an output current of the voltage converter 103. FIG. 2 shows a current feedback input 205 of the controller 105, to which the current feedback information comes from the current detection circuit 215 (coupling B-B).

The target waveform may be more complicated than in the simple example of FIGS. 3 to 5, so that it comprises two or more local extremes. The amplitude scaling explained above may affect the overall amplitude (amplitude at every point of the time axis) or only some part of it, like only the largest amplitude, or the N largest amplitudes where N is 2 or more.

Additionally or alternatively, in particular the dynamically made amplitude scaling may affect only the largest amplitude that is still to come, and/or the amplitude of only those half-waves or other local extremes that are still to come.

Scaling a target waveform only by amplitude tends to change the absolute values of its derivatives. This is easy to see by comparing e.g. the three parts of FIG. 4. The first-order derivative of a graph is its steepness, i.e. the angle between a local tangent and the horizontal axis. Each downscaled version of the graph in FIG. 4 has clearly smaller values of its first derivative than its predecessors. In some cases it is advisable to do the scaling so that the values of the derivatives are maintained. This may necessitate scaling the target waveform not only in amplitude but also in length in time.

Figures 6, 7, 8:
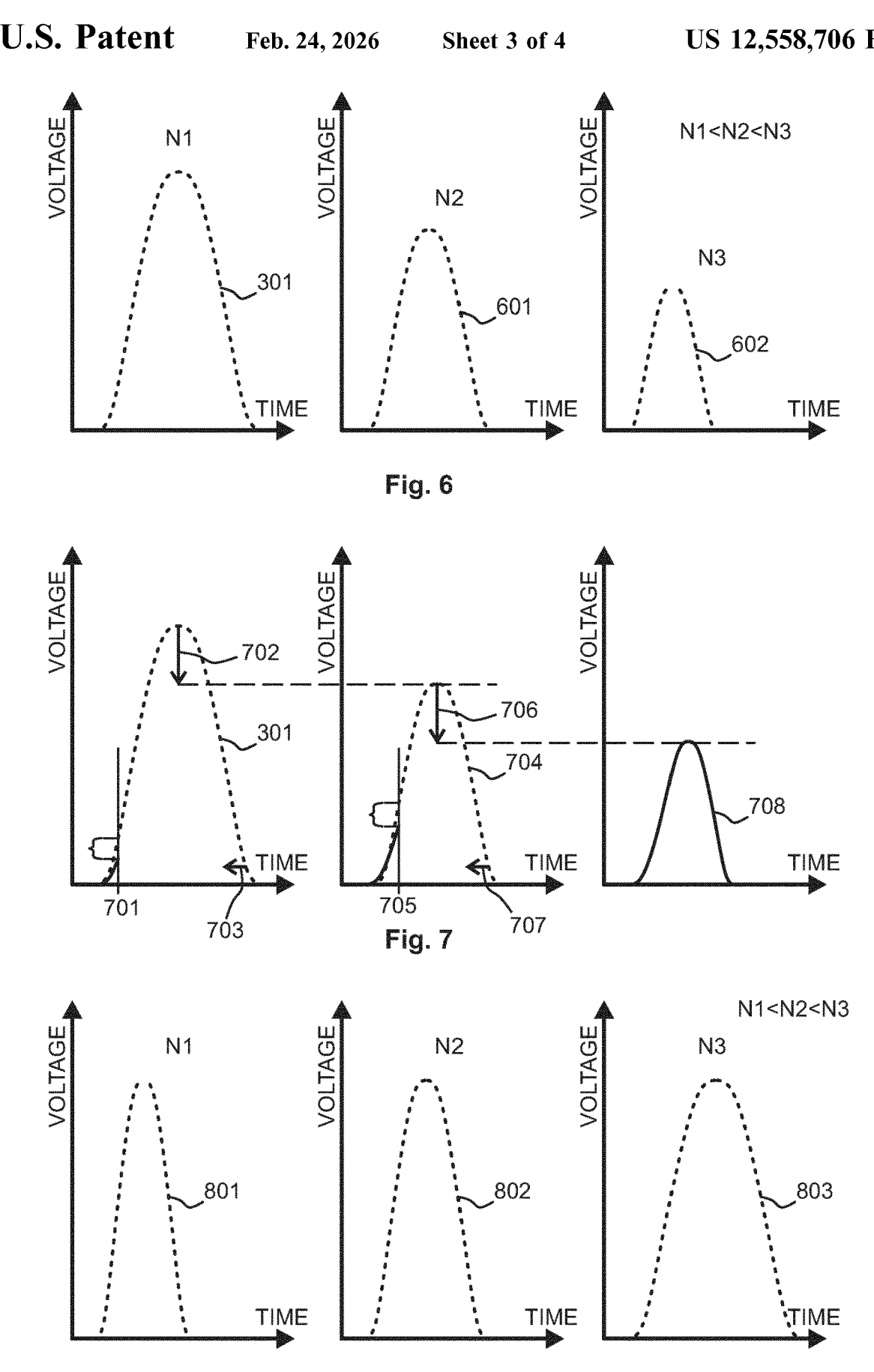
FIG. 6 illustrates an example of scaling a target waveform in advance on the basis of configuration information.
FIG. 7 illustrates an example of scaling a target waveform dynamically on the basis of feedback information.
FIG. 8 illustrates an example of scaling a target waveform in advance on the basis of configuration information.

FIGS. 6 and 7 illustrate examples where the target waveform is scaled with respect to both amplitude and length in time. In FIG. 6 the leftmost graph 301 illustrates the original target waveform, and it is used when configuration information indicates that there are N1 piezoelectric elements to be driven. Graphs 601 and 602 illustrate scaled target waveforms that are used when configuration information indicates that there are N2 or N3 piezoelectric elements respectively, where N1<N2<N3.

In FIG. 7 the leftmost graph 301 illustrates again the original target waveform, which is found impossible for the actual output voltage to follow at moment 701. Arrows 702 and 703 show how the original target waveform is scaled in both amplitude and length in time to obtain a first scaled target waveform 704. At moment 705 even this first scaled target waveform is found impossible to follow, so according to arrows 706 and 707 it is scaled again in both amplitude and length in time to obtain a second scaled target waveform, which the actual output voltage then follows from that point of time onwards as shown with the rightmost graph 708 in FIG. 7.

Scaling in time can be used also so that the amplitude of the target waveform is kept constant and only its length in time (or the length in time of a part of the target waveform) is changed. Scaling in time may take place in both directions: making the target waveform (or part of it) longer or shorter than previously. An example is shown in FIG. 8, in which the leftmost graph 801 illustrates an original target waveform for use when configuration information indicates that there are N1 piezoelectric elements to be driven. Graphs 802 and 803 illustrate scaled target waveforms that are used when configuration information indicates that there are N2 or N3 piezoelectric elements respectively, where N1<N2<N3. The same principle, i.e. scaling the target waveform longer in time, can be also applied in dynamic scaling.

Scaling the target waveform longer in time may be advantageous for load handling, because the longer rise time towards a maximum amplitude value may burden less the voltage converter.

Figure 9:
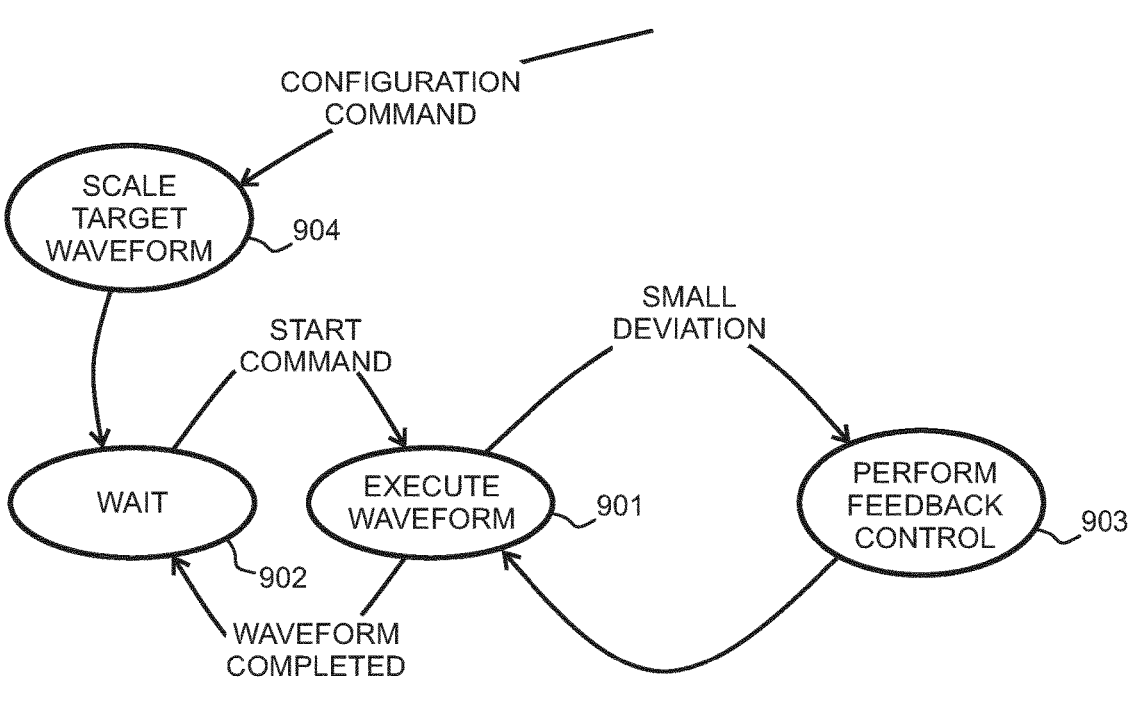
FIG. 9 illustrates an example of a method.
Figure 10:
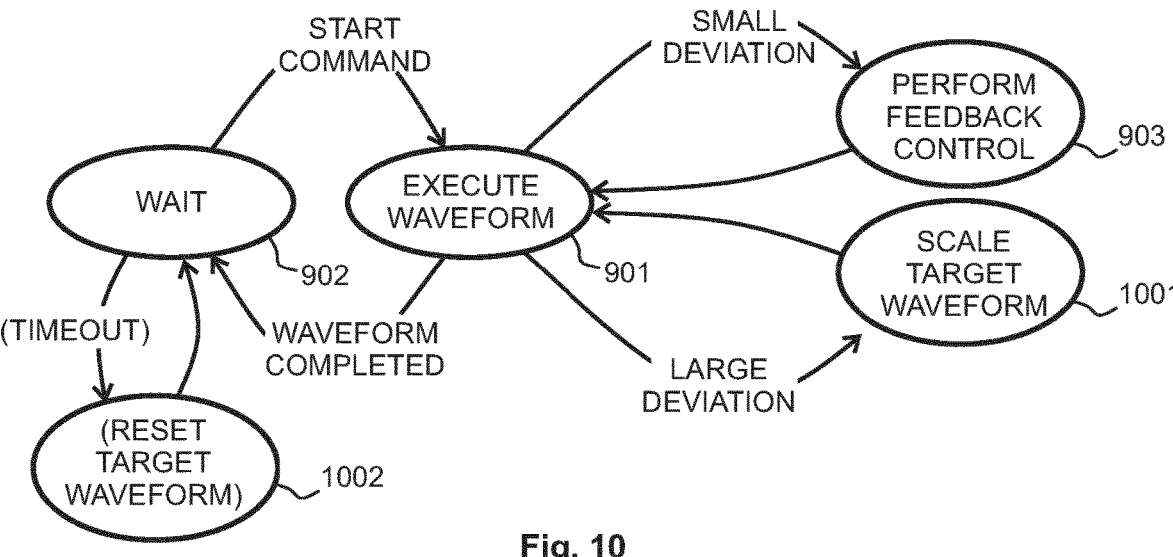
FIG. 10 illustrates an example of a method.

FIGS. 9 and 10 illustrate two examples of methods for driving piezoelectric elements in a user interface arrangement. In general, the method comprises controllably generating a voltage waveform for driving said piezoelectric elements, of which there may be one or more. The method comprises controlling the generation of said voltage waveform to make the generated voltage waveform follow a target waveform as a function of time. This is illustrated both in FIG. 9 and in FIG. 10 as the "execute waveform" step 901, which begins when a start command (such as an interrupt to a processor) comes during a wait state 902. If the generating of the voltage waveform at step 901 proceeds as expected, little more happens and the execution of the method returns to the wait state 902 after the waveform is completed.

In FIGS. 9 and 10 it is assumed that feedback control applies during the generation of the voltage waveform. Thus both FIG. 9 and FIG. 10 show how any small deviation from the target waveform, detected by analyzing feedback information, causes feedback control to be performed according to step 903.

The methods of FIGS. 9 and 10 comprise scaling the target waveform on the basis of received scaling information. FIG. 9 is pertinent to a case in which at least part of the scaling information is received in advance as configuration information. In that case also the scaling of the target waveform can be done in advance, as shown by step 904. As explained earlier in this text, the scaling at step 904 may comprise scaling at least one of an amplitude and a length in time of the target waveform.

In FIG. 10 at least a part of the scaling information is received dynamically as feedback information during the generation of the voltage waveform in step 901. This is shown in FIG. 10 as the occurrence of a "large" deviation from the currently valid target waveform, and it causes the scaling of the target waveform in step 1001. What is a large deviation can be defined in the program executed by the controller. As an example, the controller may be programmed to sample the feedback information it receives at a certain sampling frequency, so that the obtained samples constitute a sequence. If a small deviation has been found first, and feedback control has been attempted, but further values in the sequence show that the deviation does not become smaller, this can be interpreted as a "large" deviation. Additionally or alternatively there may be a threshold, defined as an absolute or relative difference to the value of the target waveform at the corresponding moment of time, that is immediately interpreted as a "large" deviation.

Irrespective of whether feedback information is used for feedback control at step 903 and/or for deciding about scaling the target waveform at step 1001, there exist the possibilities of using voltage feedback from the generation of the voltage waveform and/or current feedback of an output current used to deliver the voltage waveform to the one or more piezoelectric elements. Taken that a voltage converter is typically used to generated the voltage waveform, control signals may be given in the form of switching pulses to a power switch in the voltage converter. The method may then comprise changing at least one of a duty cycle and a switching frequency of said switching pulses to make the output voltage of the voltage converter follow the target waveform as a function of time.

FIG. 10 shows the optional step of resetting the target waveform to a default form at step 1002. This may be done for example if a timeout expires in the wait state 902. Resetting of this kind may be advantageous for example if the scaling at step 1001 took place because of some environmental conditions, like extreme cold, that can be expected to only occur from time to time so that after a lengthy idle period it is more probable that normal conditions have been resumed.

In all embodiments explained above it should be noted that advance scaling of the target waveform (on the basis of received configuration information) and dynamic scaling of the target waveform (on the basis of feedback information received during the generation of the voltage waveform) are not mutually exclusive, but can be both applied in the same arrangement. In other words, a piezoelectric user interface arrangement may be configured in advance to use a certain scaled target waveform, and additionally apply dynamic control to dynamically re-scale the target waveform if needed.

Scaling the target waveform does not mean that the whole of the target waveform needs to be scaled. The controller may decide to only scale a part of the target waveform. This applies particularly to such more versatile waveforms that have two or more local extremes. If one or some of the extremes would necessitate generating a very high and/or very steeply changing voltage, the generation of which would require more effort than the generation of the more smoothly varying parts of the voltage waveform, the scaling may apply in particular to such extremes of the target waveform.

Same or similar mechanisms that are used to detect deviations from a target waveform can also be used to identify exceptional situations like hardware faults. For example a short circuit somewhere in the load may make it difficult or impossible to get a generated voltage waveform follow a target waveform. An exceptional situation of this kind may be identified by noticing a need for exceptionally large scaling of the target waveform, and/or a difference from the target waveform that refuses to decrease despite scaling the target waveform. The controller may respond to an identified exceptional situation by interrupting any ongoing generation of voltage waveforms and reporting to a host, which may be a controlling computer higher up in device hierarchy. Additionally or alternatively the controller may notify the user, if it has suitable means for that at its disposal, like an error indicator light.

It may be advantageous to make the controller report to the host in all cases that involved scaling a target waveform. This reflects the fact that the user may have received a slightly different haptic perception due to the scaling, which in turn may make the user react in some different way, which the host (or some other system, to which there is some communications connection from the host) may need to take into account appropriately. Additionally or alternatively there may be a notification threshold, so that the controller may report to the host all cases in which the scaling of a target waveform involved scaling one or more dimensions of the target waveform by more than a respective threshold percentage.

The way in which the hardware units are organized into one or more integrated circuits and/or discrete electronics components is of little significance. As one example, at least a large part of a voltage converter and a controller may be implemented as a common, single integrated circuit. As another example, a distributed hardware approach can be taken in which the voltage converted and controller are separate circuits that may be located even at a significant distance from each other if the connections between them can be suitably arranged.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A piezoelectric user interface system, comprising:
a voltage converter configured to controllably generate voltage waveforms for driving one or more piezoelectric elements, wherein the voltage converter has at least one control input; and
a controller coupled to the at least one control input and configured to control an output voltage of the voltage converter by applying control signals to the at least one control input, wherein the controller has one or more scaling inputs;

wherein the controller is configured to;

form the control signals to make the output voltage follow an original target waveform as a function of time;

determine that the original target waveform cannot be followed; and in response to determining that the original target waveform cannot be followed, scale the original target waveform based on scaling information received through the one or more scaling inputs so as to allow the output voltage to deviate from the original target waveform and follow the scaled target waveform.

2. The piezoelectric user interface system according to claim 1, wherein the controller is configured to scale an amplitude of the original target waveform on the basis of the scaling information.

3. The piezoelectric user interface system according to claim 1, wherein the controller is configured to scale a length in time of the original target waveform on the basis of the scaling information.

4. The piezoelectric user interface system according to claim 1, wherein the scaling input comprises a configuring input for receiving at least a part of the scaling information in advance as configuration information.

5. The piezoelectric user interface system according to claim 1, wherein the scaling input comprises a feedback input for receiving at least a part of the scaling information dynamically as feedback information during the generation of a voltage waveform.

6. The piezoelectric user interface system according to claim 5, wherein the feedback input comprises a voltage feedback input for receiving feedback of the output voltage.

7. The piezoelectric user interface system according to claim 5, wherein the feedback input comprises a current feedback input for receiving feedback of an output current of the voltage converter.

8. The piezoelectric user interface system according to claim 1, wherein the scaling input comprises an internal input for using a quantity internal to the controller as the scaling information.

9. The piezoelectric user interface system according to claim 1, wherein:

the voltage converter comprises a boost converter that comprises a power switch for closing and opening a current path through a boost inductor, the control signals comprise switching pulses to the power switch, and the controller is configured to change at least one of the duty cycle and the switching frequency of the switching pulses for controlling the output voltage.

10. A method for operating a piezoelectric user interface system, comprising:

controllably generating, by a voltage converter of the piezoelectric user interface system, voltage waveforms for driving one or more piezoelectric elements, wherein the voltage converter has at least one control input; and controlling, by a controller of the piezoelectric user interface system coupled to the at least one control input, an output voltage of the voltage converter by applying control signals to the at least one control input, wherein the controller has one or more scaling inputs;

wherein controlling the output signal comprises:

forming, by the controller, the control signals to make the output voltage follow an original target waveform as a function of time;

determining, by the controller, that the original target waveform cannot be followed; and in response to determining that the original target waveform cannot be followed, scaling, by the controller, the original target waveform based on scaling information received through the one or more scaling inputs so as to allow the output voltage to deviate from the original target waveform and follow the scaled target waveform.

*   *   *   *   *